United States Patent
Wang

[11] Patent Number: 6,105,600
[45] Date of Patent: Aug. 22, 2000

[54] INFLATION DEVICE COMPRISING A CONNECTION HEAD COMPATIBLE WITH INFLATION VALVES OF U.S. TYPE AND FRENCH TYPE

[76] Inventor: Lopin Wang, 16F-2, No. 17, Lane 52, Sec. 3, Je-He Road, Taichung, Taiwan

[21] Appl. No.: 09/409,847

[22] Filed: Oct. 1, 1999

[51] Int. Cl.$^7$ .................................................. F16K 15/20
[52] U.S. Cl. .......................................... 137/231; 137/223
[58] Field of Search ..................................... 137/223, 231

[56] References Cited

U.S. PATENT DOCUMENTS

| | | | |
|---|---|---|---|
| 1,784,822 | 12/1930 | Crowley | 137/223 |
| 3,926,205 | 12/1975 | Gourlet | 137/223 |
| 5,342,018 | 8/1994 | Wu | 137/223 X |
| 5,749,392 | 5/1998 | Glotin | 137/231 |
| 5,762,095 | 6/1998 | Gapinski et al. | 137/223 |
| 5,960,815 | 10/1999 | Wang | 137/231 X |
| 5,975,109 | 11/1999 | Wu | 137/231 |
| 5,983,920 | 11/1999 | Gapinski et al. | 137/231 |

*Primary Examiner*—John Rivell
*Assistant Examiner*—Meredith H. Schoenfeld
*Attorney, Agent, or Firm*—Browdy and Neimark

[57] ABSTRACT

An inflation device has a connection head which is formed of a housing with a compartment having an open end. A swivel handle is fastened pivotally with the open end. The compartment is provided at other end thereof with an air valve mouth. An elastic holding member is disposed in the compartment and provided with a through hole split with the air valve mouth. A press member presses against the holding member such that the through hole of the press member is split with the through hole of the holding member. An actuation member and a valve pressing member are disposed in the through hole of the press member. The inflation valve of the U.S. type is received in the through hole of the holding member before the swivel handle is swiveled to cause the press member to squeeze the holding member so as to hold securely the inflation valve, which is kept open by the valve pressing member actuated by the actuation member. The inflation valve of the French type is put through the holding member to push the valve pressing member to the end, thereby resulting in the deformation of the holding member. The deformed holding member holds securely the inflation valve, which is kept open by the valve pressing member actuated by the actuation member.

13 Claims, 4 Drawing Sheets ly to an inflation device, and more particularly to an inflation device comprising a head capable of an automatic adjustment to fit an inflation valve of the U.S. type or the French type.

INFLATION DEVICE COMPRISING A CONNECTION HEAD COMPATIBLE WITH INFLATION VALVES OF U.S. TYPE AND FRENCH TYPE

FIELD OF THE INVENTION

The present invention relates generally to an inflation device, and more particularly to an inflation device comprising a head capable of an automatic adjustment to fit an inflation valve of the U.S. type or the French type.

BACKGROUND OF THE INVENTION

The bicycle tire is generally provided with an air valve of the U.S. type or the French type. For this reason, two kinds of the bicycle air pumps must be used to inflate the bicycle tire. There are certain conventional bicycle air pumps which are provided with two connection heads engageable respectively with the air valve of the U.S. type and the air valve of the French type. For example, the U.S. patent Ser. No. 08/903,444 discloses an inflation device comprising two connection heads which are respectively adapted for the air valve of the U.S. type and the air valve of the French type. However, the inflation device in question is not user-friendly.

SUMMARY OF THE INVENTION

It is therefore the primary objective of the present invention to provide a user-friendly inflation device, which comprises a connection head compatible with the tire air valves of the U.S. type and the French type.

The foregoing objective of the present invention is achieved by an inflation device comprising a head which is formed of a housing with a compartment. The compartment has one end which is open, and other end which is provided with an air valve mouth for receiving an air valve of an inflatable object. The compartment is provided therein with an elastic holding member which has a large diametrical fisheye hole adapted for the air valve of the U.S. type, and a small diametrical fisheye hole adapted for the ail valve of the French type. The compartment is further provided with a press member capable of displacing along the longitudinal direction of the compartment. The press member has an inner end pressing against the holding member, and an outer end which is located at the open end of the compartment. The press member has a through hole split with the through hole of the holding member, and an air guide hole in communication with the through hole of the press member. The through hole of the press member is provided in the wall thereof with an inclined surface and is further provided therein with an actuation member capable of displacing along the longitudinal direction of the through hole, an elastic member which pushes the actuation member toward the open end of the compartment. The through hole of the press member is further provided therein with a valve pressing member. The actuation member has a receiving space with an opening which faces the air valve mouth. The outer end of the actuation member is located at the open end of the compartment. The inner end of the actuation member has a pliable arm. As the actuation member moves relative to the press member in the direction toward the air valve mouth, the pliable arm is forced by the inclined surface to bend inward. The housing is further provided with a swivel handle which is pivotally fastened therewith such that the swivel handle presses against the open end of the compartment, and that the swivel handle can be swiveled from a standby position to an operation position at which the swivel handle pushes the press member and the actuation member. The actuation member is greater in displacement than the press member. In operation, the inflation valve of the U.S. type is inserted into the compartment such that the inflation valve is stopped in the through hole of the holding member. As the swivel handle is swiveled, the holding member is squeezed by the press member to hold securely the inflation valve. In the meantime, the pliable arm of the actuation member presses against a predetermined portion of the valve pressing member, thereby causing the valve pressing member to displace to press open the inflation valve. In operation of the inflation valve of the French type, the inflation valve is put through the holding member to push the valve pressing member to move to the bottom of the receiving space. The holding member is deformed to hold securely the inflation valve. In the meantime, the valve pressing member is forced to displace by the actuation member, thereby causing the valve pressing member to displace to press open the inflation valve.

The foregoing objective, features, functions, and advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
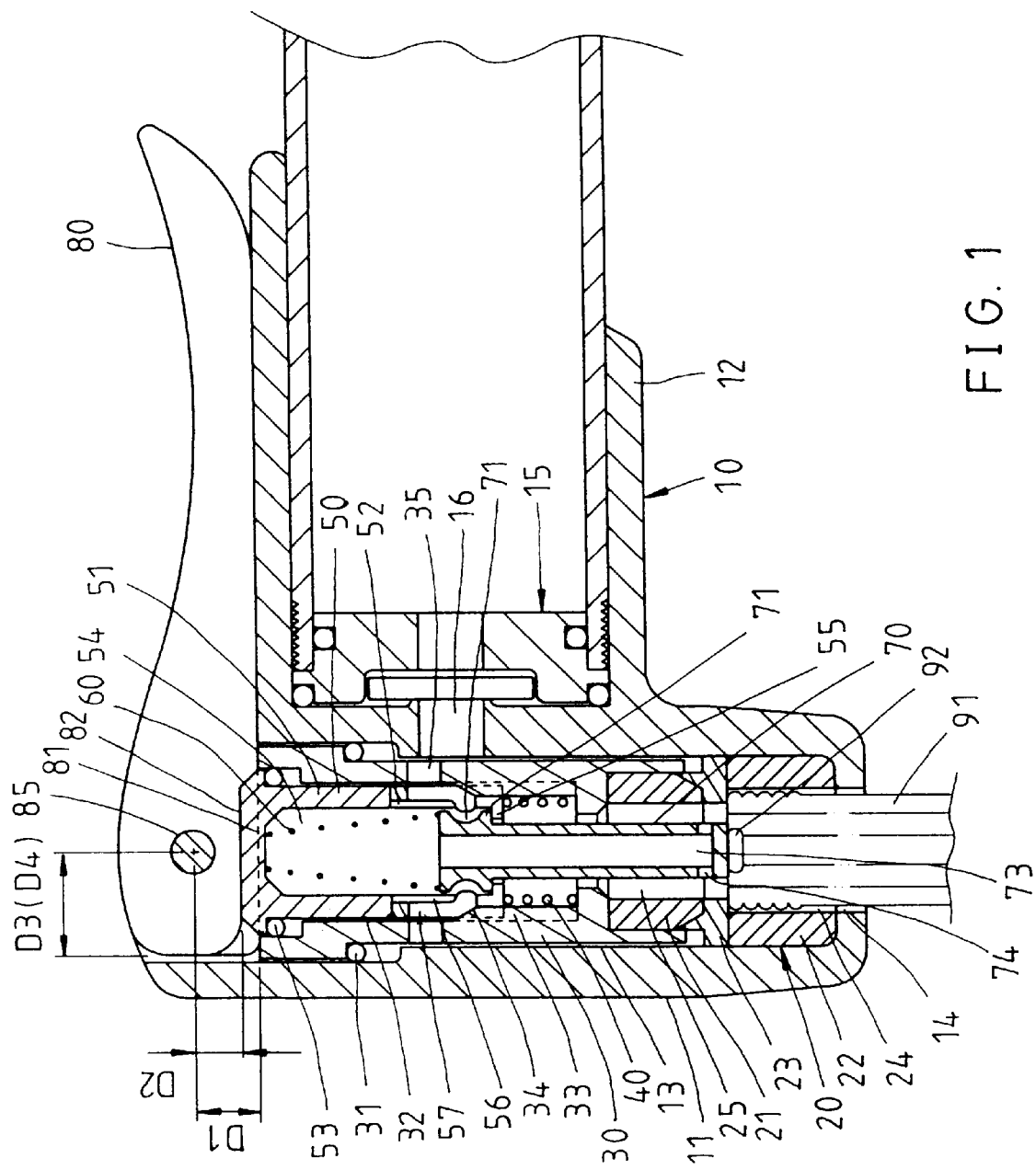
FIGS. 1 and 2 are schematic views of the operation of a preferred embodiment of the present invention in conjunction with the inflation valve of the U.S. type.

As shown in all drawings provided herewith, a connection head of the inflation device of the present invention comprises a housing 10, an elastic holding member 20, a press member 30, a retrieving elastic member 40, an actuation member 50, a pushing elastic member 60, a valve pressing member 70, and a swivel handle 80.

The housing 10 is formed of a cylindrical body 11 and a tubular body 12 connected with the cylindrical body 11 such that the tubular body 12 is perpendicular to the cylindrical body 11. The cylindrical body 11 is provided therein with a cylindrical compartment 13 which has an open top end and a bottom end having an air valve mouth 14 in communication with atmospheric air. The embodiment of the present invention is applied to a hand-held air pump such that the tubular body 12 of the housing 10 is securely fastened with the cylinder pipe of the air pump, or a hose which is connected with an air pump, or inflation device of any type. The tubular body 12 is provided therein with a check valve 15 similar in construction to the prior art check valve. The air output of the inflation device is allowed to pass through the check valve 15 in a one-way manner to enter the compartment 13 via an air inlet 16 of the peripheral wall of the compartment 13.

The elastic holding member 20 is disposed in the bottom end of the compartment 13 and is formed of a first ring block 21 of a rubber material, a second ring block 22 of the rubber material, and a plastic ring plate 23 located between the first and the second ring blocks 21 and 22. The first ring block 21 is smaller in inner diameter and outer diameter than the second ring block 22. The first ring block 21, the second ring block 22, and the plastic ring plate 23 are stacked to form a two-sectioned cylindrical structure which is provided at the bottom end thereof with a large diametrical hole 24, and a small diametrical hole 25 extending from the inner end of the large diametrical hole 24 through the top end of the cylindrical structure. The large diametrical hole 24 is slightly large than the inflation valve of the U.S. type, whereas the small diametrical hole 25 is slightly large than the inflation valve of the French type. The holding member 20 of the present invention may be integrally made of the rubber material.

The press member 30 is of a cylindrical construction and is disposed in the compartment 13 of the housing 10 such that the bottom end the press member 30 is fitted with the holding member 20, and that the top end of the press member 30 is located at the open end of the compartment 13, and further that the periphery of the press member 30 does not come in contact with the inner wall of the compartment 13. The press member 30 is provided in the proximity of the top end thereof with a leakproof ring 31. The press member 30 has a through hole 32 extending along the longitudinal direction thereof such that the bottom end of the through hole 32 is split with the small diametrical hole 25 of the holding member 20. The hole wall of the through hole 32 is provided with two ribs 33 opposite to each other. The ribs 33 are provided at the top end thereof with an inclined surface 34. The press member 30 is further provided in the outer periphery thereof with two air guide holes 35 extending oppositely to the through hole 32.

The retrieving elastic member 40 is a coil spring and is disposed in the bottom end of the through hole 32 of the press member 30 such that the bottom end of the elastic member 40 urges the press member 30.

The actuation member 50 is disposed in the through hole 32 of the press member 30 and is formed of a capped cylindrical member 51 and a tubular member 52, which are formed integrally. The bottom end of the actuation member 50 is urged by the elastic member 40, whereas the top end of the actuation member 50 is located at the top end of the through hole 32. The outer periphery of the actuation member 50 does not come in contact with the inner wall of the through hole 32 in which the actuation member 50 is disposed. The actuation member 50 is provided in the proximity of the top end thereof with a leakproof ring 53. The actuation member 50 has a receiving space 54 with an opening which faces downward. The receiving space 54 is provided with a stop portion 55. The actuation member 50 is provided in the inner wall thereof with two slots 56 corresponding to the two ribs 33, and two pliable arms 57 each extending from the slot 56. The actuation member 50 can not be turned in view of the complementary association of the slots 56 with the two ribs 33.

The pushing elastic member 60 is a coil spring and is disposed in the receiving space 54 of the actuation member 50 such that the top end of the elastic member 60 urges the actuation member 50.

The valve pressing member 70 is of a round rodlike construction and is disposed in the through hole 32 of the press member 30 such that the top end of the valve pressing member 70 is located in the receiving space 54 of the actuation member 50, and that the top end of the valve pressing member 70 is urged by the bottom end of the elastic member 60. The valve pressing member 70 has a stop portion 71 cooperative with the stop portion 55 of the actuation member 50 to prevent the valve pressing member 70 from slipping out of the receiving space 54 of the actuation member 50. In assembly, the valve pressing member 70 is put through the tubular member 52 before being fitted with the capped cylindrical member 51 such that the top end of the valve pressing member 70 is retained in the receiving space 54.

Figure 2:
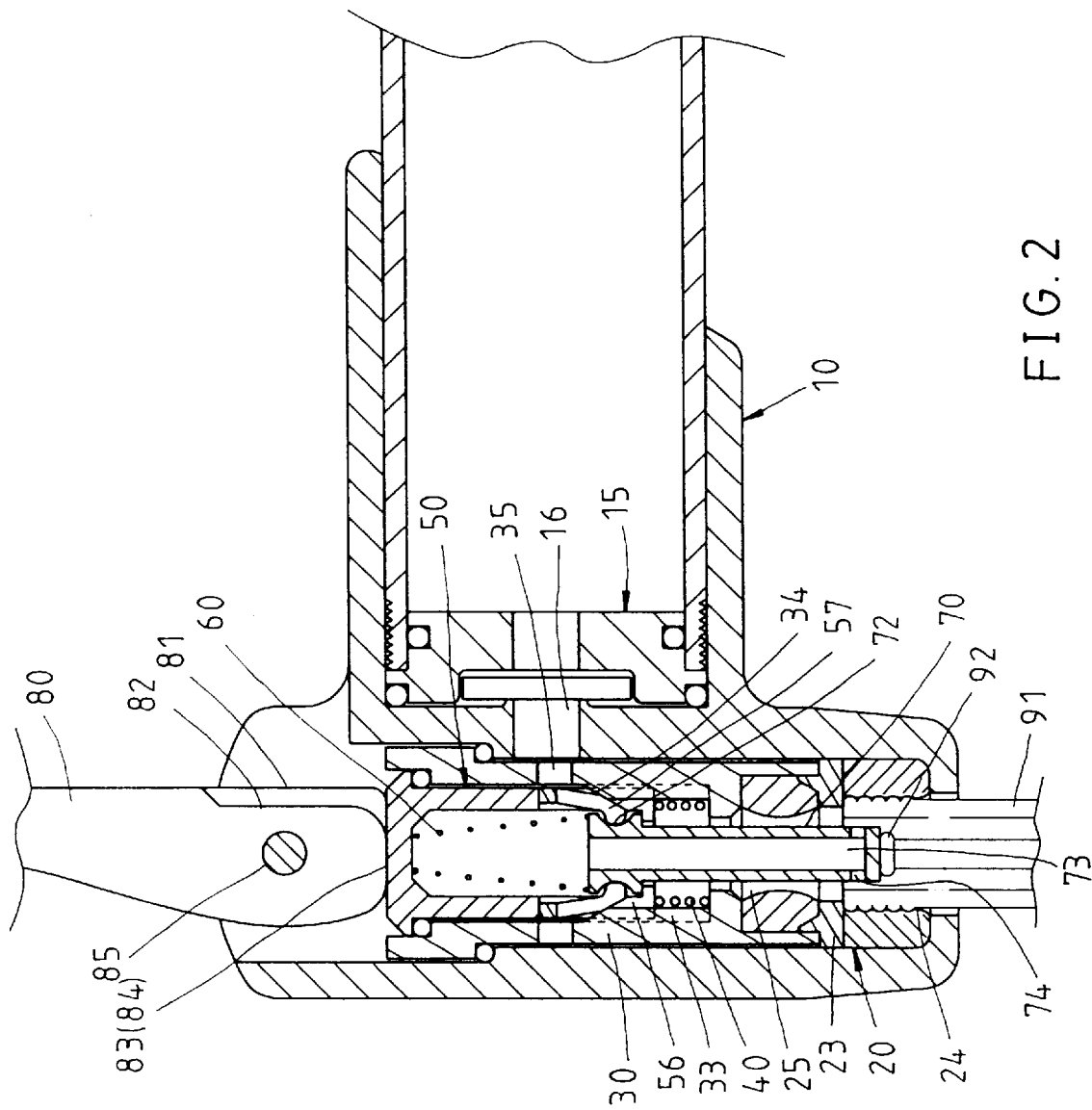
Figure 3:
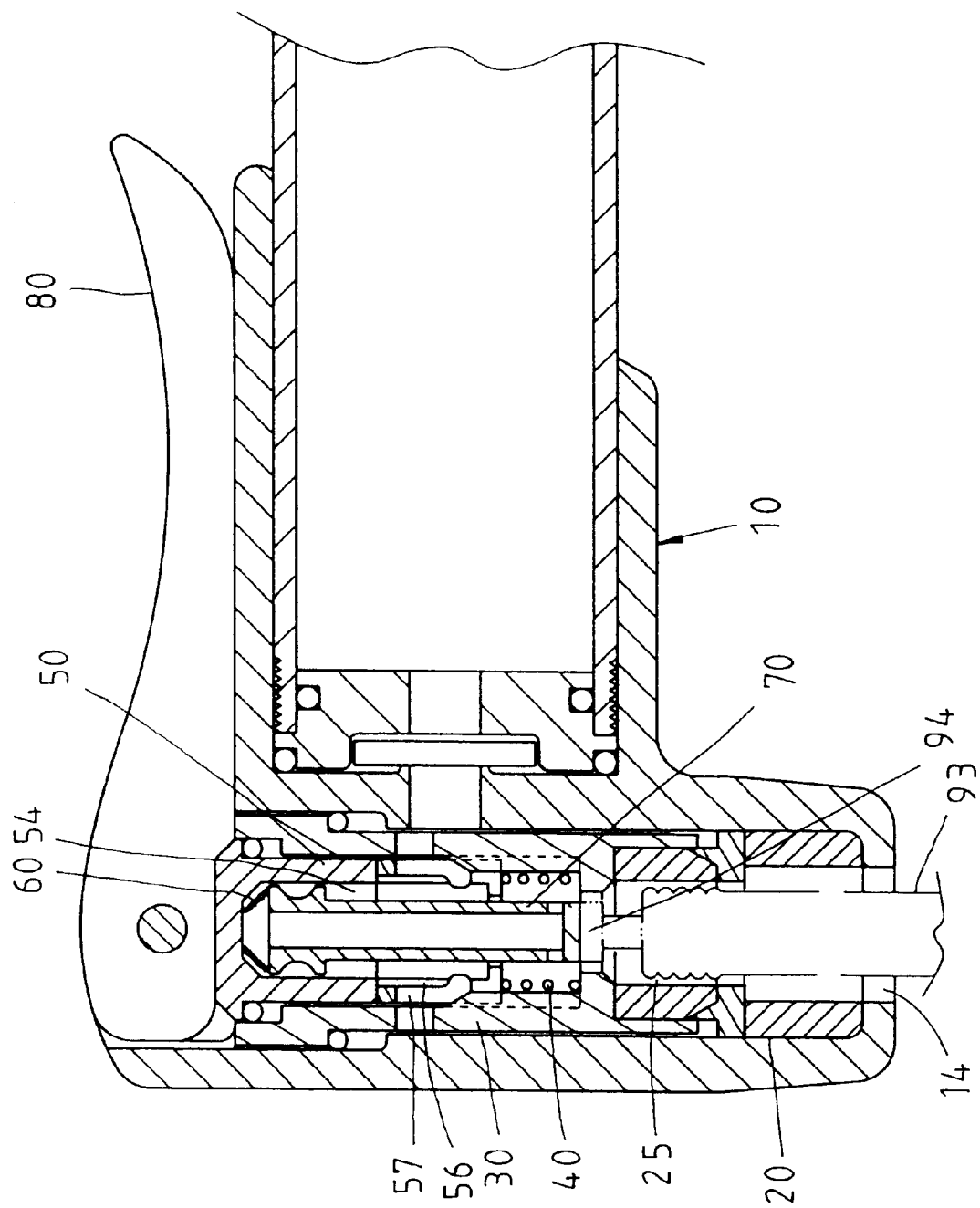
FIGS. 3 and 4 are schematic views of the operation of the preferred embodiment of the present invention in conjunction with the inflation valve of the French type.
Figure 4:
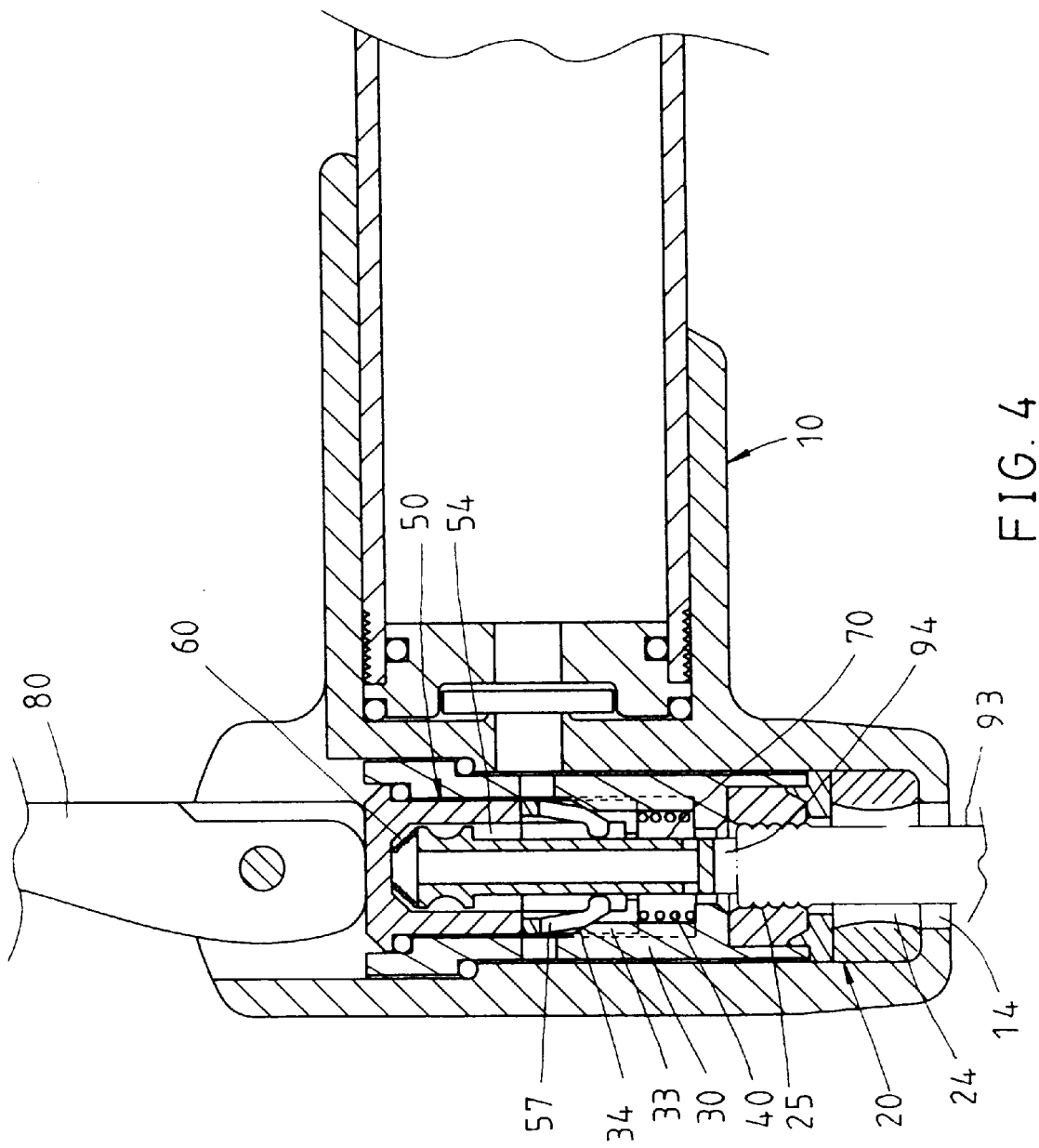

The swivel handle 80 is fastened pivotally by a pivot 86 with the top side of the cylindrical body 11 of the housing 10 such that the swivel handle 80 can swivel between a standby position, as shown in FIGS. 1 and 3, and an operation position, as shown in FIGS. 2 and 4. When the swivel handle 80 is located at the standby position, a first press portion 81 presses against two sides of the top end of the press member 30 such that a second press portion 82, which is a recess formed in the first press portion 81, stops the top end of the actuation member 50. When the swivel handle 80 is located at the operation position, a third press portion 83 presses against the press member 30 while a fourth press portion 84 presses against the actuation member 50. The third press portion 83 and the fourth press portion 84 of the preferred embodiment of the present invention are coplanar. A vertical distance D3 between the third press portion 83 and the pivot 85 of the swivel handle 80 is greater than a vertical distance D1 between the first press portion 81 and the pivot 85. A vertical distance D4 between the fourth press portion 84 and the pivot 85 is greater than a vertical distance D2 between the second press portion 82 and the pivot 85, as shown in FIG. 1. As a result, when the swivel handle 80 is moved to the operation position, the pressed member 30 and the actuation member 50 are pressed by the swivel handle 80 to displace downward. In light of the subtraction valve of D4–D2 being greater than that of D3–D1, the downward displacement quantity of the actuation member 50 is therefore greater than that of the press member 30. In other words, the actuation member 50 can further displace downward relative to the press member 30.

As shown in FIG. 1, the valve pressing member 70 is pushed downward by the elastic member 60 such that the top end of the valve pressing member 70 is retained at the opening of the receiving space 54, and that the bottom end of the valve pressing member 70 is located at the bottom end of the small diametrical hole 25 of the holding member 20. In the meantime, the tail end of the pliable arm 57 of the actuation member 50 comes in contact with the inclined surface 34 to locate at the outer side of the recessed arcuate pressed portion 72 of the top end of the valve pressing member 70. In operation, the air valve mouth 14 of the housing 10 is engaged with the inflation valve 91 of the U.S. type, as shown in FIG. 1, such that the inflation valve 91 is stopped at the shoulder between the large diametrical hole 24 and the small diametrical hole 25 of the holding member 20. As the swivel handle 80 is swiveled to locate at the operation position from the standby position, the elastic holding member 20 is squeezed by the press member 30 to cause the large diametrical hole 24 to hold securely the inflation valve 91 of an inflatable object. When the actuation member 50 slides downward relative to the press member 30, the tail ends of the two pliable arms 57 are forced by the inclined surface 34 to bend inward such that the protruded portions of the inner sides of the pliable arms 57 hold the pressed portion 72 of the valve pressing member 70, and that the valve pressing member 70 is carried along to move downward. As a result, the air valve bar 92 of the inflation valve 91 is pressed by the valve pressing member 70 to open up the inflation valve 91, as shown in FIG. 2. The inflation device pumps air into the compartment 13 from which the air is guided into the through hole 32 of the press member 30 via the air guide hole 35 of the press member 30. The air is finally injected into the inflation valve 91 through the holding member 20. In order to promote the air flow, the valve pressing member 70 of the present invention is provided with an axial hole 73 extending from the top thereof to the inside thereof, and a radial hole 74 extending from the periphery thereof to the axial hole 73. Upon completion of the air pumping operation, the swivel handle 80 is swiveled back to the standby position, thereby causing the elastic holding member 20 and the retrieving elastic member 40 to force the press member 30 and the actuation member 50 to return to their original positions.

As shown in FIGS. 3 and 4, the inflation valve 93 of the French type is received in the small diametrical hole 25 of the holding member 20 such that the valve pressing member 70 is pushed upward to press against the inner end of the receiving space 54, as shown in FIG. 3. As the swivel handle 80 is swiveled from the standby position to the operation position, the elastic holding member 20 is deformed such that the small diametrical hole 25 holds securely the inflation valve 93. When the actuation member 50 displaces downward relative to the press member 30, the press member 70, which is retained in the receiving space 54, is carried along by the actuation member 50 to displace downward to press against the air valve by 94 of the inflation valve 93, thereby opening up the inflation valve 93, as shown in FIG. 4. In this case, the pliable arm 57 is incapable of holding the pressed portion 72 of the valve pressing member 70 at the time when the actuation member 50 displaces downward in relation to the press member 30.

What is claimed is:

1. A connection head of an inflation device, said connection head comprising:

a housing with a long compartment having an open end, said compartment being provided at other end thereof with an air valve mouth, and in a periphery thereof with an air inlet;

an elastic holding member disposed in said compartment such that said elastic holding member is corresponding in location to one end of said air valve mouth, said elastic holding member having a large diametrical hole extending from said air valve mouth, and a small diametrical hole extending from the underside of said large diametrical hole to another side;

a long press member disposed in said compartment such that said press member displaces along the longitudinal direction of said compartment, and that an inner end of said press member presses against said holding member, and further that an outer end of said press member is located at said open end of said compartment, said press member having a through hole extending through the longitudinal direction thereof such that said through hole is split with said small diametrical hole of said holding member, said press member further having at least one air guide hole extending from a periphery thereof to said through hole whereby said through hole is provided in a wall thereof with an inclined surface;

a long actuation member disposed in said through hole of said press member such that said actuation member displaces along a longitudinal direction of said through hole, said actuation member having a receiving space which is provided with an opening facing said air valve mouth, said receiving space being provided in the proximity of said opening with a stop portion, said actuation member being disposed in said through hole of said press member in such a manner that an outer end of said actuation member is located at the outer end of said press member whereby said actuation member is provided at an inner end thereof with at least one pliable arm corresponding in location to said inclined surface;

a retrieving elastic member disposed in said through hole of said press member such that one end of said retrieving elastic member urges said press member, and that other end of said retrieving elastic member urges said actuation member in a direction toward the outer end of said press member;

a valve pressing member having a length and disposed in said through hole of said press member such that said valve pressing member displaces along the longitudinal direction of said through hole to move into said receiving space, said valve pressing member having a stopped portion which can be stopped by said stop portion, said valve pressing member further having a pressed portion which can be pressed against by said pliable arm;

a pushing elastic member disposed in said receiving space such that one end of said pushing elastic member urges said actuation member, and that other end of said pushing elastic member urges said valve pressing member in a direction toward said air valve mouth; and a swivel handle fastened pivotally by a pivot with said housing such that said swivel handle is corresponding in location to said open end of said compartment, said swivel handle having a first press portion, a second press portion, a third press portion, and a fourth press portion whereby said swivel handle swivels from a standby position to an operation position and vice versa such that said first press portion and said second press portion press respectively against said press member and said actuation member at the time when said swivel handle is located at the standby position, and that said third press portion and said fourth press portion press respectively against said press member and said actuation member at the time when said swivel handle is located at the operation position, said pivot and said third press portion being separated by a first distance greater than a second distance between said pivot and said first press portion, said pivot and said fourth press portion being separated by a third distance greater than a fourth distance between said pivot and said second press portion, said third distance and said fourth distance having a difference greater than a difference between said first distance and said second distance.

2. The connection head as defined in claim 1, wherein said through hole of said press member is of a cylindrical construction and is provided in a peripheral wall of an inner end thereof with two ribs opposite to each other, said two ribs being provided at one end thereof with said inclined surface corresponding in location to the outer end of said press member; wherein said actuation member is of a cylindrical construction, said receiving space extending inward from an end thereof, said actuation member being provided in an inner wall thereof with two slots corresponding in location to and engageable with said two ribs; wherein said pliable arm extends outward from the bottom of said slots.

3. The connection head as defined in claim 2, wherein said actuation member is formed of a capped cylindrical member and a tubular member; and wherein said valve pressing member is provided at one end thereof with said pressed portion whereby said one end is located in said receiving space.

4. The connection head as defined in claim 1, wherein said actuation member has an outer end which is extended beyond the outer end of said press member at such time when said actuation member is in a normal state; wherein said first press portion of said swivel handle presses against an outer side of an end of said press member; wherein said second press portion is more recessed than said first press portion; wherein said third press portion and said fourth press portion are coplanar.

5. The connection head as defined in claim 1, wherein said elastic holding member is formed of a first ring block of a soft material, a second ring block of the soft material, and a ring plate of a rigid material and located between said first ring block and said second ring block whereby said first ring block is smaller in inner diameter and outer diameter than said second ring block.

6. The connection head as defined in claim 1, wherein said elastic holding member is integrally made of a rubber material.

7. The connection head as defined in claim 1, wherein said pliable arm has a tail end which is provided with an inclined outer side corresponding to said inclined surface.

8. The connection head as defined in claim 1, wherein said pliable arm has a tail end which is provided with a protruded inner side; wherein said pressed portion of said valve pressing member is of an arcuate recessed construction.

9. The connection head as defined in claim 1, wherein said press member is provided at the outer end thereof with a leakproof ring fitted thereover such that said leakproof ring is located between said air inlet and said open end of said compartment.

10. The connection head as defined in claim 1, wherein said actuation member is provided at the outer end thereof with a leakproof ring fitted thereover such that said leadproof ring is located between said air guide hole and an open end of said through hole of said press member.

11. The connection head as defined in claim 1, wherein said valve pressing member is provided with an axial hole extending inward from one end thereof corresponding in location to said open end of said compartment, and a radial hole extending from a periphery thereof to said axial hole.

12. The connection head as defined in claim 1, wherein said retrieving elastic member is a coil spring.

13. The connection head as defined in claim 1, wherein said pushing elastic member is a coil spring.

* * * * *